United States Patent
Rowe (10) Patent No.: US 6,714,482 B2
(45) Date of Patent: Mar. 30, 2004

(54) ACOUSTIC DOPPLER CHANNEL FLOW MEASUREMENT SYSTEM

(75) Inventor: Francis D. Rowe, San Diego, CA (US)

(73) Assignee: RD Instruments, Inc., San Diego, CA (US)

( * ) Notice: Subject to any disclaimer, the term of this patent is extended or adjusted under 35 U.S.C. 154(b) by 0 days.

(21) Appl. No.: 10/231,366

(22) Filed: Aug. 27, 2002

(65) Prior Publication Data

US 2003/0076742 A1 Apr. 24, 2003

Related U.S. Application Data

(60) Provisional application No. 60/315,580, filed on Aug. 28, 2001.

(51) Int. Cl.[7] .............................. G01S 15/50; G01F 1/66
(52) U.S. Cl. ......................... 367/90; 367/89; 73/170.13; 73/861.25
(58) Field of Search ............................. 367/87, 89, 90; 73/861.25, 861.26, 170.13

(56) References Cited

U.S. PATENT DOCUMENTS

| | | | | |
|---|---|---|---|---|
| 4,065,745 A | * | 12/1977 | Robinson ...................... 367/91 |
| 4,270,191 A | * | 5/1981 | Peynaud ................... 73/170.13 |
| 5,077,700 A | * | 12/1991 | Shaw et al. ................... 367/90 |
| 5,521,883 A | * | 5/1996 | Fage et al. .................... 367/90 |
| 5,694,372 A | * | 12/1997 | Perennes ...................... 367/90 |
| 5,923,617 A | | 7/1999 | Thompson et al. |

FOREIGN PATENT DOCUMENTS

JP 2000111375 * 4/2000 ............. G01F/1/68

* cited by examiner

*Primary Examiner*—Ian J. Lobo
(74) *Attorney, Agent, or Firm*—Knobbe Martens Olson & Bear LLP (57) ABSTRACT

An improved acoustic Doppler flow measurement system which employs multiple acoustic frequencies to acquire multiple independent backscatter data from the flow channel, combining the data to enable survey measurement of channel flow properties beyond what can be achieved with either a single frequency system or multiple independent single frequency systems. The system is installed on small moving channel survey boats, remotely measuring vertical profiles of river currents, achieving accurate surveys of channel flow velocity structure and bottom topography, enabling accurate (approximately 1% resolution) survey measurement of channel flow discharge. Significant synergistic improvements are realized from both physical and functional integrations of the multi-frequency operational capability into a single integrated flow survey system. Use of phased array transducer techniques further reduces flow disturbance and transducer size, enabling use on even smaller survey boats.

50 Claims, 2 Drawing Sheets

ACOUSTIC DOPPLER CHANNEL FLOW MEASUREMENT SYSTEM

RELATED APPLICATIONS

This application claims priority from U.S. Provisional Application Serial No. 60/315,580 filed Aug. 28, 2001 titled IMPROVED ACOUSTIC DOPPLER CHANNEL FLOW MEASUREMENT SYSTEM.

BACKGROUND OF THE INVENTION

1. Field of the Invention

The invention relates to underwater sound technology and, in particular, concerns an acoustic Doppler flow measurement system used to measure properties of rivers, estuaries, harbors, and man made channels.

2. Description of the Related Art

Acoustic Doppler flow measurement systems are commonly used to survey the total volume of flow in channels. The use of acoustic Doppler flow measurement systems mounted on small boats for channel discharge measurement has revolutionized hydrology. They offer faster, more accurate and safer methods of measuring channel discharge and surveying channel current structure than traditional techniques. Specifically, some of the advantages include: (1) measurements are made in a fraction of time associated with traditional methods, (2) many more measurements are made at once for improved accuracy, and (3) river traffic is not impeded by cross-river cableways used in traditional methods.

Traditional channel flow measurement systems typically employ single point current meters and depth sounders. The current meters are mechanically lowered down through the channel water column with a mechanical winching system mounted on a survey boat. The boat is typically attached to a cross channel cable, moving from one fixed location to another across the channel. The boat is held at a substantially fixed position while channel current velocities are measured at several water depths at each location by mechanically lowering single point current meters with a boat mounted mechanical winching system. Measurements with an acoustic depth sounder are also made at each location. Channel discharge is then estimated from these sample measurements by computing the product of the measured mean channel flow velocity (estimated from the current velocity measurements) and the channel cross sectional area (estimated form the water depth measurements).

The advantages of a the moving-boat acoustic Doppler flow measurement technique are derived form the unique capability to make substantially all the necessary measurements necessary for computation of channel discharge remotely from a moving boat, along the path of the boat as it travels across the channel. The acoustic Doppler flow measurement system remotely measures vertical profiles water flow velocity, earth referenced boat velocity, and water depth. These three parameters are all measured substantially continuously as the boat travels across the channel. Water velocity is determined throughout the water column by measuring the Doppler shifted echoes from small particles in the water column. Earth referenced boat velocity is determined by measuring the Doppler shifted echoes from the channel bottom. The boat's velocity vector can be determined from electromagnetic navigation systems such as GPS or from direct measurements of the Doppler shifted echoes from the stationary bottom of the river. In some cases, both GPS and bottom track Doppler measurements are combined via a Kalman filter to give an enhanced boat velocity estimate.

Boat position during the survey is computed from the earth-referenced boat velocity measurements. This position information is used to guide the boat operator across the river, and to position tag the water velocity profile and water depth data. Earth-referenced mean flow velocity is computed at incremental boat positions across the channel by subtracting the boat referenced horizontal water flow velocity profile measurements from the earth-referenced boat velocity measurements. River cross section is determined from the water depth and boat position measurements. Channel discharge is then computed from the product of the measured from the mean velocity and the channel cross sectional area.

At present, two types of boat mounted acoustic Doppler flow measurement channel survey systems are commonly used commercially. First is a low frequency acoustic Doppler flow measurement system that uses signals in the range 300–600 kHz to accurately measure river current profiles over depth ranges 0.5 to 30 m. The low frequency acoustic Doppler flow measurement systems typically have relatively large conventional multi-piston transducers. Second type is a high-frequency acoustic Doppler flow measurement system that uses signals in the range 1200–2400 kHz to accurately measure river current profiles over depth ranges of 0.1 to 10 m. The high frequency Acoustic Flow Measurement Systems typically have relatively smaller conventional multi-piston transducers.

One limitation of these existing systems is that in order to measure current profiles in a wide range of channel conditions (depth, flow velocity, sediment conditions, etc), for example 0.1 to 30 m depth range, two separate measurements need to be made using the two types (high & low frequency) of acoustic flow measurement systems. Another limitation of using two separate systems is the size and weight of the acoustic two separate transducers and the disturbance of the flow which they cause. The two multi-piston transducers are not easy to streamline to minimize instrument flow disturbance. An additional limitation is that speed of sound in water needs to be determined. This necessitates the measurement of the water's temperature and salinity, both of which can vary substantially in tidal rivers and estuaries.

Another limitation of a single frequency instrument is that trade-offs must be made between profiling ranges and spatial resolution. Deep rivers require use of low frequency systems in order for the sound to reach the full depth. The consequence is, however, that the vertical spatial resolution of the measurements is relatively coarse. Also, the minimum detection range may be substantial so that no data is collected near the surface. Conversely, high frequency systems provide improved spatial resolution and can make measurements near the surface but cannot penetrate to the deeper portions of the river. In addition, the high frequency signal may not be able to detect the bottom echo which is necessary to correct for the motion of the boat.

A further limitation is that the data from each can not easily be combined to allow for using the data from one system to improve the performance of the other. Hence, based on these limitations, there is a need for a small profile acoustic Doppler flow measurement system that permits channel measurements in wider depth ranges. There is also a need for an acoustic Doppler flow measurement system that does not need to depend on measurement of speed of sound in water to make accurate channel measurements.

SUMMARY OF THE INVENTION

In one aspect, the aforementioned needs are satisfied by a Doppler sonar flow measurement system comprising a transducer assembly mounted on a platform. The transducer assembly is adapted to transmit two or more different frequency acoustic signals underwater and then receive backscattered echoes of the acoustic signals. The system further comprises an electronic assembly that drives the transducer assembly to generate the two or more different frequency acoustic signals, and processes the echoes so as to determine relative velocity of underwater characteristics of a river flowing in a defined channel. The system further comprises a housing assembly that houses the transducer assembly so as to reduce the disturbance of the flow of the river caused by the sonar system.

In one embodiment, the housing assembly comprises a single housing that houses the transducer assembly. In one embodiment, the transducer assembly comprises two or more transducers wherein each transducer transmits at a characteristic frequency. In another embodiment, the transducer assembly comprises a first phased array transducer transmitting at a first frequency and a second phased array transducer transmitting at a second frequency. In one implementation, the first frequency is in a range of approximately 300–600 KHz and the second frequency is in a range of approximately 1200–2400 KHz.

In one embodiment, the platform is a fixed structure relative to the defined channel and the transducer assembly mounted thereon measures the flow velocity of the river with respect to the fixed structure. In another embodiment, the platform is a boat moving relative to the defined channel, the transducer assembly mounted thereon measures the flow velocity of the river with respect to the boat. The transducer assembly can also measure the motion of the boat relative to the bottom of the defined channel.

In another aspect, the aforementioned needs are satisfied by a Doppler sonar flow measurement system comprising at least one phased array mounted on a platform. Each of the at least one phased array comprises a plurality of transducer elements arranged in a selected manner. The at least one phased array is adapted to transmit acoustic signals underwater and receive their backscattered echoes. The system further comprises an electronic assembly that drives the at least one phased array to generate the acoustic signals, and processes the echoes so as to determine relative velocity of underwater characteristics of a river flowing in a defined channel. The system further comprise a housing assembly that houses the at least one phased array so as to reduce the disturbance of the flow of the river caused by the sonar system.

In one embodiment, the sonar system comprises a first phased array operating at a first frequency and a second phased array operating at a second frequency. In one implementation, the first frequency is in a range of approximately 300–600 KHz and the second frequency is in a range of approximately 1200–2400 KHz.

In one embodiment, the platform is a fixed structure relative to the defined channel and the at least one phased array mounted thereon measures the flow velocity of the river with respect to the fixed structure. In another embodiment, the platform is a boat moving relative to the defined channel and the at least one phased array mounted thereon measures the flow velocity of the river with respect to the boat. The at least one phased array also measures the motion of the boat relative to the bottom of the defined channel.

In yet another aspect, the aforementioned needs are satisfied by a Doppler sonar flow measurement system comprising at least two phased arrays mounted on a platform. Each of the at least two phased arrays comprises a plurality of transducer elements arranged in a selected manner and the at least two phased arrays are adapted to operate at different frequencies to transmit acoustic signals underwater and receive their backscattered echoes. The system further comprises an electronic assembly that drives the at least two phased arrays at the different frequencies, and processes the echoes so as to determine relative velocity of underwater characteristics of a river flowing in a defined channel. The system further comprises a housing assembly that houses the at least two phased arrays so as to reduce the disturbance of the flow of the river caused by the sonar system.

In one embodiment, wherein the housing assembly comprises a single housing that houses the at least two phased arrays. In one embodiment, the sonar system comprises a first phased array operating at a first frequency and a second phased array operating at a second frequency. In one implementation, the first frequency is in a range of approximately 300–600 KHz and the second frequency is in a range of approximately 1200–2400 KHz.

In one embodiment, the platform is a fixed structure relative to the defined channel and the at least two phased arrays mounted thereon measure the flow velocity of the river with respect to the fixed structure. In another embodiment, the platform is a boat moving relative to the defined channel and the at least two phased arrays mounted thereon measure the flow velocity of the river with respect to the boat. One of the at least two phased arrays measures the motion of the boat relative to the bottom of the defined channel.

In yet another aspect, the aforementioned needs are satisfied by a method of measuring flow velocity of a river. The method comprises mounting a Doppler sonar system on a boat wherein the sonar system comprises a first and a second acoustic transducer operating at different frequencies. The method further comprises streamlining the mounted sonar system so as to reduce its effect on the disturbance of the flow of the river. The method further comprises transmitting a first and a second acoustic signal into the river. The first signal is transmitted by the first transducer and the second signal is transmitted by the second transducer. The method further comprises receiving and processing backscattered echoes of the first and second acoustic signals. The echo from the first signal is used to measure the flow velocity of the river within a first range and the echo from the second signal is used to measure the flow velocity of the river within a second range.

In one implementation, the method further comprises traversing the river on the boat to measure a sectional profile of the river's flow velocity. One of the acoustic signals is used to measure boat's velocity relative to the bottom of the river.

In one implementation, transmitting the first and second signals comprises transmitting the first signal at a first frequency and transmitting the second signal at a second frequency. Preferably, the first frequency is in a range of approximately 300–600 KHz and the second frequency is in a range of approximately 1200–2400 KHz. The method may further comprise offsetting the motion of the boat from the measurement using the first frequency acoustic signal to determine the boat's motion relative to the bottom of the river.

In yet another aspect, the aforementioned needs are satisfied by a method of measuring flow velocity of a river. The method comprises mounting a Doppler sonar system on a boat wherein the sonar system comprises a phased array of transducers. The method further comprises streamlining the mounted sonar system so as to reduce its effect on the disturbance of the flow of the river. The method further comprises transmitting into the river at least one set of a plurality of acoustic beams formed by the phased array, and receiving a plurality of backscattered echoes from the river. The method further comprises processing the echoes to determine the flow velocity of the river. The plurality of acoustic beams from the phased array system permit measurement of the flow velocity independent of speed of sound in the water.

In one implementation, the method further comprises traversing the river on the boat to measure a sectional profile of the river's flow velocity. The method may further comprise offsetting the motion of the boat from the measurement using a low frequency acoustic signal to determine the boat's motion relative to the bottom of the river.

In one implementation, transmitting into the river comprises transmitting a first set of acoustic beams at a first frequency and a second set of acoustic beams at a second frequency. Preferably, the first frequency is in a range of approximately 300–600 KHz and the second frequency is in a range of approximately 1200–2400 KHz.

In yet another aspect, the aforementioned needs are satisfied by a method of measuring flow velocity of a river. The method comprises mounting a Doppler sonar system on a boat wherein the sonar system comprises a first and a second acoustic transducer operating at different frequencies. The method further comprises transmitting a first and a second acoustic signal into the river. The first signal is transmitted by the first transducer and the second signal is transmitted by the second transducer. The method further comprises receiving and processing backscattered echoes of the first and second acoustic signals. The echo from the first signal is used to measure the flow velocity of the river within a first range and the echo from the second signal is used to measure the flow velocity of the river within a second range.

In one implementation, the method further comprises traversing the river on the boat to measure a sectional profile of the river's flow velocity. One of the acoustic signals is used to measure boat's velocity relative to the bottom of the river.

In one implementation, transmitting the first and second signals comprises transmitting the first signal at a first frequency and transmitting the second signal at a second frequency. Preferably, the first frequency is in a range of approximately 300–600 KHz and the second frequency is in a range of approximately 1200–2400 KHz. The method may further comprise offsetting the motion of the boat from the measurement using the first frequency acoustic signal to determine the boat's motion relative to the bottom of the river.

In yet another aspect, the aforementioned needs are satisfied by a method of measuring flow velocity of a river. The method comprises mounting a Doppler sonar system on a boat wherein the sonar system comprises a phased array of transducers. The method further comprises transmitting into the river at least one set of a plurality of acoustic beams formed by the phased array, and receiving a plurality of backscattered echoes from the river. The method further comprises processing the echoes to determine the flow velocity of the river. The plurality of acoustic beams from the phased array system permit measurement of the flow velocity independent of speed of sound in the water.

In one implementation, the method further comprises traversing the river on the boat to measure a sectional profile of the river's flow velocity. The method may further comprise offsetting the motion of the boat from the measurement using a low frequency acoustic signal to determine the boat's motion relative to the bottom of the river.

In one implementation, transmitting into the river comprises transmitting a first set of acoustic beams at a first frequency and a second set of acoustic beams at a second frequency. Preferably, the first frequency is in a range of approximately 300–600 KHz and the second frequency is in a range of approximately 1200–2400 KHz.

DETAILED DESCRIPTION OF THE PREFERRED EMBODIMENT

Figure 1:
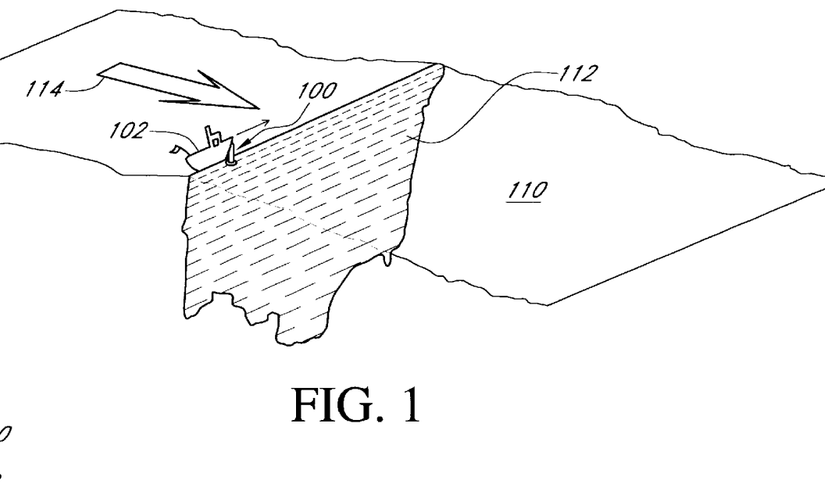
FIG. 1 illustrates a measurement of a flow field in a river by an acoustic Doppler flow measurement system mounted on a small boat.

Reference will now be made to the drawings wherein like numerals refer to like parts throughout. FIG. 1 illustrates an acoustic flow measurement system 100 mounted on a boat 102 traversing a river 110. As the boat 102 is traversing the river 110, the acoustic flow measurement system 100 measures a cross section 112 of flow 114 of the river 110. Various embodiments of the invention described below use multiple frequency and/or phased array acoustic Doppler flow measurement systems for determining the water flow structure and total volume of flow in a river, estuary, harbor, or man-made channel. It will be appreciated that the measurements of underwater characteristics of rivers and similar flowing bodies of water may include, but not limited to, current profile, depth, total volume of flow, and sediment content.

The multiple frequency system represents a substantial advancement in the field of river and channel flow measurement. In general, high frequency systems provide high precision and high spatial resolution measurements over relatively short ranges. Lower frequency systems provide lower precision measurements at a given spatial resolution or the same precision at coarser spatial resolution. However, they provide these measurements over a substantially larger range. The combination of multiple frequency operation into a single instrument permits multiple measurements of the river in a single pass.

Another advantage of the dual frequency system is that it can provide greater information on a sediment load carried by the river. This is based on the fact that acoustic flow measurement systems measure backscattered intensity versus range in addition to a velocity profile of the river. The intensity return can be used to infer sediment load. However, with only a single frequency system available, there are ambiguities in this measurement. In particular, a small number of large scatterers is difficult to distinguish from a large number of small scatterers. The use of dual or multiple frequencies provides additional information which can be used to resolve these ambiguities and more accurately determine the particle content of the water.

The phased array system also represents a substantial advancement in the field of river and channel flow measurement. Unlike conventional systems which use multiple individual piston transducers to form individual beams, a phased array system forms all of the multiple beams from a single multi-element planar array transducer. The beams are formed by an electronic beamformer which introduces selected phase shifts to signals being provided to the individual transducer elements. Sound waves resulting from the phase shifted signals combine to form multiple beams of sound whose direction and intensity can be controlled electronically. The phased array system further receives multiple reflected beams and processes the resulting signals so as to form usable data. Advantages afforded by the phased array systems include reduction in transducer volume and a flat transducer face that can be streamlined. Small volume and flat face facilitate substantial reduction in flow disturbance of the river due to the acoustic flow measurement system. In one embodiment, the reduction is approximately a factor of 10. The phased array acoustic flow measurement system can also be easily adapted for multiple frequency implementation. The phased array acoustic flow measurement system, as described below, does not require knowledge of speed of sound in the river.

Figure 2:
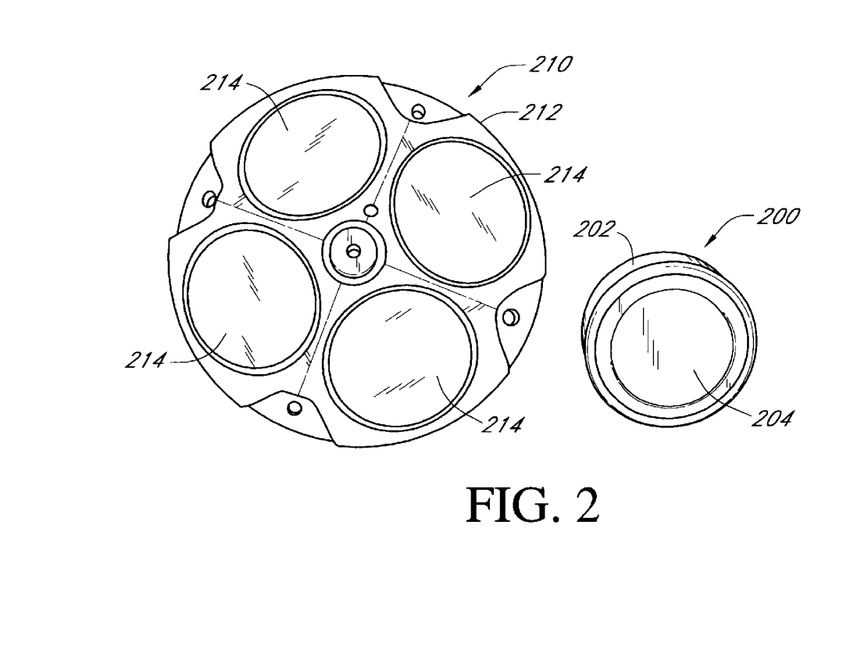
FIG. 2 illustrates one embodiment of the invention that uses a phased array transducer operating at 600 kHz, showing its relative small size compared to a conventional 600 kHz multi-piston transducer.

FIG. 2 illustrates a single frequency phased array acoustic flow measurement system 200 as one embodiment of the invention. The phased array acoustic flow measurement system 200 is shown with a housing 202 and a flat transducer face 204 from which a plurality of sound beams are transmitted in a manner described below. The phased array acoustic flow measurement system 200 illustrated in FIG. 2 operates at a frequency of 600 kHz. FIG. 2 also illustrates, for comparison, a conventional 600 kHz multi-piston transducer acoustic flow measurement system 210 comprising a housing 212 and four pistons 214. The overall size of the phased array acoustic flow measurement system 200 is approximately ¹⁄₁₀ that of the conventional multi-piston transducer acoustic flow measurement system 210.

Figure 3:
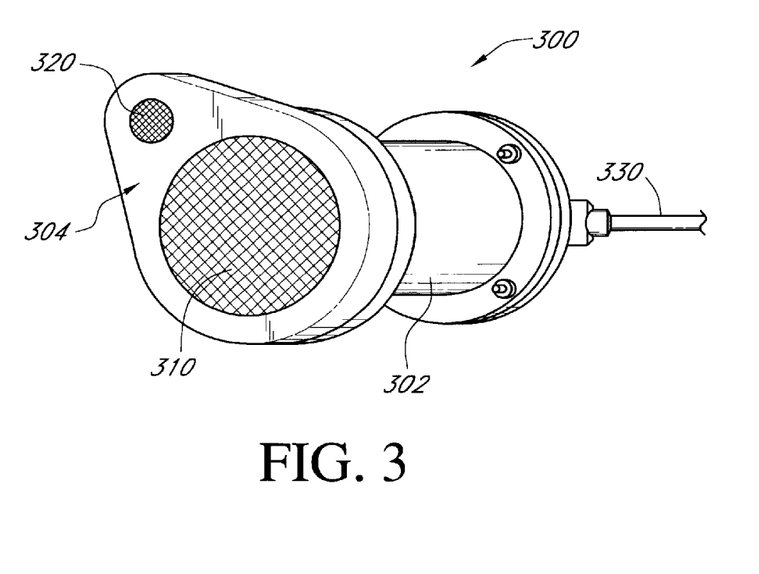
FIG. 3 illustrates another embodiment of the invention comprising a single unit configuration of a dual frequency phased array acoustic flow measurement system.

FIG. 3 illustrates one embodiment of the invention wherein a dual frequency phased array acoustic flow measurement system 300 is packaged in a single housing 302. A flat transducer face 304 comprises a low frequency phased array transducer 310 and a high frequency phased array transducer 320. In this embodiment, electronics (not shown) that drive the transducers 310, 320 are housed inside the housing 302, and are connected to a controller (not shown) by a cable 330.

Figure 4:
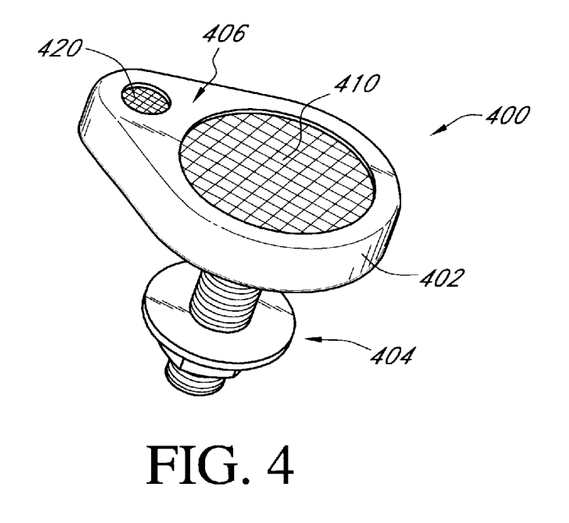
FIG. 4 illustrates another embodiment of the invention comprising a hull mounted dual frequency phased array transducer.

FIG. 4 illustrates one embodiment of the invention wherein a dual frequency phased array acoustic flow measurement system 400 is packaged into a housing 402 and is adapted to be mounted on a hull of a boat by a mounting assembly 404. A flat transducer face 406 comprises a low frequency phased array transducer 410 and a high frequency phased array transducer 420. In this embodiment, electronics that drive the transducers 410, 420 are located away from the acoustic flow measurement system 400. The transducers 410, 420 are connected to the electronics by a cable (not shown) adapted to extend through the mounting assembly 404.

It will be appreciated that the moving-boat acoustic Doppler flow measurement system described herein permits use of multiple acoustic frequencies to acquire multiple independent backscatter data from the flow channel, combining the data to enable survey measurement of channel flow properties beyond what can be achieved with either a single frequency system or multiple independent single frequency systems. In one embodiment, the system is installed on small channel survey boats, remotely measuring vertical profiles of river currents along the path of travel of the boat across the channel, achieving accurate surveys of channel flow velocity structure and bottom topography, enabling accurate (approximately 1% resolution) survey measurement of channel flow discharge. The system operates by transmitting multiple acoustic frequencies, receiving backscattered echoes from water mass and bottom at these multiple acoustic frequencies, and processing the multiple echoes, and computing the channel discharge. User of data unique to each acoustic frequency provides for expanding the range of measurement beyond that achievable with a single frequency system. Specifically, use of higher frequency signals affords advantages of high velocity time and space resolution measurements close to the transducers, whereas the lower frequency signals permit measurements that are farther from the transducers.

Significant synergistic improvements are realized from both physical and functional integrations of the multi-frequency operational capability into a single integrated flow survey system. Functional integration of multi-frequency capability affords advantages of 1) efficient system implementation through shared system resources, and 2) improved performance from integrated data processing by overlapping data from two frequencies to allow combining the overlapping measurements to optimize the calculated result. Physical integration of the multi-frequency capability reduces the system performance degradation due to flow disturbance created by the system, and also enables the system, particularly the acoustic transducer to be small, streamlined system for use on small survey boats. Use of phased array transducer techniques further reduces integrated multi-frequency system flow disturbance and transducer size, enabling use on even smaller survey boats.

Underwater Sound Dynamics

Various aspects of the underwater sound dynamics are now described to demonstrate some of the advantages provided by the acoustic Doppler flow measurement system described above. The basic relationship between spatial resolution and frequency can be expressed as $$\Delta R = c/(2\beta f_c), \quad (1)$$

where $\Delta R$ is the range resolution cell size, $f_c$ is the carrier frequency, and $\beta$ is the fractional bandwidth of the sonar. Thus, for constant fractional bandwidth, the range resolution is inversely proportional to carrier frequency.

Maximum profiling range is a complicated function of many factors including both system and environmental parameters. Echo level is a measure of the signal strength of the echo returning from the acoustic flow measurement system's transmitted pulse. Echo level depends on factors that include sound absorption, beam spreading, transmitted power, and backscatter coefficient. The echo level can be expressed as $$EL = SL + S_v 10 \log(V) - 40 \log(R) - 2\alpha R \quad (2)$$

where EL is the echo level (dB re 1 uPa), SL is the source level or transmitted power (dB re 1 uPa @ 1 m), $S_v$ is the water-mass volume backscattering strength (dB re 1 m$^{-1}$), V is the scattering volume, $\alpha$ is the absorption coefficient (dB/meter), and R is the distance from the transducer (meters).

The scattering volume can be expressed as $$V = R^2 \Delta R \Psi, \quad (3)$$

where $\Delta R$ is the range resolution cell size and $\Psi$ is the effective beam solid angle. Since the scattering volume increases proportional to $R^2$, the overall decrease of echo level with range is given by 20 log $R + 2\alpha R$. The term $2\alpha R$ accounts for absorption and 20 log (R) accounts for beam spreading. Substituting Equation 3 into Equation 2 leads to the relationship $$EL = SL + S_v + 10 \log(\Delta R \Psi) - 20 \log(R) - 2\alpha R. \quad (4)$$

The maximum range (Rmax) of the acoustic flow measurement system corresponds to the location where the signal strength drops to levels comparable to the noise level (NL). That is, $$EL(R\max) = NL. \quad (5)$$

Beyond this range the acoustic flow measurement system cannot accurately calculate Doppler shifts.

Sound Absorption

Absorption reduces the strength of echoes as a result of physical and chemical processes in water. Absorption in the ocean is more rapid than in fresh water, primarily because of chemical reactions. Absorption causes a linear reduction (proportional to $2\alpha R$ above) of echo level with range when measured in dB. This means that absorption causes echo level to decay exponentially with increasing range. Sound absorption (in dB/meter) increases roughly in proportion to frequency within the frequency range in which acoustic flow measurement systems operate (75–1200 kHz; see Table 1 or Urick, 1983). This produces an inverse relationship between frequency and range.

TABLE 1

Sound absorption (At 4° C., 35% and at sea level) and nominal profiling range of a BroadBand acoustic flow measurement system. The transmit power listed is the maximum power that can be transmitted subject to limitations caused by shock formation.

| Frequency (kHz) | $\alpha$(dB/m) | Range (m) | @ Power (W) |
|---|---|---|---|
| 75 | 0.022–0.028 | 700 | 250 |
| 150 | 0.039–0.050 | 400 | 250 |
| 300 | 0.062–0.084 | 120 | 80 |
| 600 | 0.14–0.20 | 60 | 30 |
| 1200 | 0.44–0.66 | 25 | 15 |

The sound absorption values given in Table 1 come from Urick (1983) and Kinsler, et al. (1980).

Ringing

Another frequency dependent factor which affects the performance of acoustic flow measurement system is transducer ringing. Ringing is an effect in which energy from the transmitted pulse lingers after the pulse is finished. If there were no ringing, the transducer could receive echoes immediately after transmitting. However, echo signals are weak and it does not take much ringing to contaminate the echoes. Thus, the acoustic flow measurement system must wait for the ringing to die away before it can listen to and process the echoes. This waiting time is called the blanking period. Table 2 shows typical ringing times for various frequency acoustic flow measurement systems. These ringing times are approximately equal to the default blanking period.

TABLE 2

Typical ringing times, expressed as distances in front of the transducer.

| Frequency (kHz) | Ringing distance (m) |
|---|---|
| 75 | 6 |
| 150 | 4 |
| 300 | 2 |
| 600 | 1 |
| 1200 | 0.5 |

Ringing biases velocity data toward zero velocity because the ringing signal is not Doppler-shifted. Sources of ringing include receiver electronics, transducer and/or electronics housing, sea chest in a ship, and ship's hull.

In general, plastic housings ring less than metal housings. Sea chests covered with acoustic windows reflect sound around inside and thus cause greater ringing. Ringing is a particular problem in low backscattering environments because the ringing energy stays above the weak echo signals longer. The principal significance of ringing in river measurement systems is that it limits the ability to a single frequency acoustic flow measurement system to measure flow very close to the transducer. The higher frequency transducer in a dual frequency system will permit better measurements to be made in the upper portion of the water column since its ringing time will be less than the lower frequency transducer.

Rivers are complex environments in that they vary greatly in size, volume of flow, sediment load, turbulence of the flow, and characteristics of the bottom. In addition to variations among rivers, different portions of the same river may present wide variations in conditions. The areas near the banks may be relatively shallow and may have a totally different bottom type than the central portions of the river.

A multiple frequency river system has several advantages over a single frequency system. First, a single system can be used over a wide variety of river types. The system can be set to use the optimum frequency of operation for the particular river environment. This selection can be made either automatically or manually. Selection criteria would include the river's depth, bottom characteristics, and the desired spatial resolution of the measurements. Second, in deeper rivers, the combined use of two or more frequencies will allow high resolution measurements in the upper portions of the water column while still covering the entire depth of the river. In addition, the robust bottom track capability of the lower frequency unit can be used to remove the boat's motion from the measurements of the higher frequency unit. Finally, acoustic flow measurement systems measure backscattered intensity in addition to the velocity profile. This can be used to infer sediment load carried by the river. However, with only a single frequency system available, there are ambiguities in this measurement. In particular, a small number of large scatterers cannot be distinguished from a larger number of smaller scatterers. The use of dual or multiple frequencies provides additional information which can be used to resolve these ambiguities and more accurately determine the particle content of the water.

Speed of Sound Independence

The ability of a phased array to measure flow velocity without knowing the speed of sound in the medium is based on the fact that the direction of the beam, $\theta$, formed by the array varies with the speed of sound, c, such that the quantity $\sin \theta / c$ is constant. This quantity also appears in the relationship between the Doppler frequency shift, $f_D$, and the flow velocity, v. That is, the Doppler frequency shift can be expressed as $$f_D = 2f_0 v(\sin \theta/c) \quad (6)$$

where $f_0$ is the transmitted frequency, v is the flow velocity, and θ is the beam angle relative to the normal to the face of the array. The equation for the beam angle of a phased array can be expressed as $$\sin \theta = c\Delta\phi/(2\pi f_0 d), \quad (7)$$

where $\Delta\phi$ is the phase shift applied by the beamformer between elements of the array and d is the inter-element spacing. Therefore, combining Equation 7 and Equation 6 results in $$f_D = (\Delta\phi/\pi)(v/d) \quad (8)$$

which does not involve the speed of sound in the medium.

Although the foregoing description has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions, but should be defined by the appended claims.

What is claimed is:

1. A Doppler sonar flow measurement system comprising:
   a transducer assembly mounted on a platform wherein the transducer assembly is adapted to transmit plurality of different frequency acoustic signals underwater and then receive backscattered echoes of the acoustic signals, wherein the transducer assembly comprises a first phased array transducer transmitting at a first frequency and a second phased array transducer transmitting at a second frequency;
   an electronic assembly that drives the transducer assembly to generate the plurality of different frequency acoustic signals, and processes the echoes so as to determine relative velocity of underwater characteristics of a river flowing in a defined channel; and
   a housing assembly that houses the transducer assembly so as to reduce the disturbance of the flow of the river caused by the sonar system,
   wherein the first and second phased array transducers are adapted to measure underwater characteristics of the river at two different, respective, depth ranges.

2. The system of claim 1, wherein the housing assembly comprises a single housing that houses the transducer assembly.

3. The system of claim 1, wherein the transducer assembly comprises two or more transducers wherein each transducer transmits at a characteristic frequency.

4. The system of claim 1, wherein the first frequency is in a range of approximately 300–600 KHz and the second frequency is in a range of approximately 1200–2400 KHz.

5. The system of claim 1, wherein the platform is a fixed structure relative to the defined channel and wherein the transducer assembly mounted thereon measures the flow velocity of the river with respect to the fixed structure.

6. The system of claim 1, wherein the platform is a boat moving relative to the defined channel and wherein the transducer assembly mounted thereon measures the flow velocity of the river with respect to the boat.

7. The system of claim 6, wherein the transducer assembly measures the motion of the boat relative to the bottom of the defined channel.

8. The system of claim 1, wherein the electronic assembly is housed in the housing assembly.

9. The system of claim 1, wherein the river is a man-made channel.

10. A Doppler sonar flow measurement system comprising:
    at least one phased array mounted on a platform wherein each of the at least one phased array comprises a plurality of transducer elements arranged in a selected manner and wherein the at least one phased array comprises a first phased array operating at a first frequency and a second phased array operating at a second frequency, and is adapted to transmit a plurality of different frequency acoustic signals underwater and receive their backscattered echoes;
    an electronic assembly that drives the at least one phased array to generate the acoustic signals, and processes the echoes so as to determine relative velocity of underwater characteristics of a river flowing in a defined channel; and
    a housing assembly that houses the at least one phased array so as to reduce the disturbance of the flow of the river caused by the sonar system,
    wherein the first and second phased arrays are adapted to measure underwater characteristics of the river at two different, respective, depth ranges.

11. The system of claim 9, wherein the first frequency is in a range of approximately 300–600 KHz and the second frequency is in a range of approximately 1200–2400 KHz.

12. The system of claim 10, wherein the platform is a fixed structure relative to the defined channel and wherein the at least one phased array mounted thereon measures the flow velocity of the river with respect to the fixed structure.

13. The system of claim 10, wherein the platform is a boat moving relative to the defined channel and wherein the at least one phased array mounted thereon measures the flow velocity of the river with respect to the boat.

14. The system of claim 13, wherein the at least one phased array measures the motion of the boat relative to the bottom of the defined channel.

15. The system of claim 10, wherein the electronic assembly is housed in the housing assembly.

16. A Doppler sonar flow measurement system comprising:
    at least two phased arrays mounted on a platform wherein each of the at least two phased arrays comprises a plurality of transducer elements arranged in a selected manner and wherein the at least two phased arrays are adapted to operate at different frequencies to transmit acoustic signals underwater and receive their backscattered echoes;
    an electronic assembly that drives the at least two phased arrays at the different frequencies, and processes the echoes so as to determine relative velocity of underwater characteristics of a river flowing in a defined channel; and
    a housing assembly that houses the at least two phased arrays so as to reduce the disturbance of the flow of the river caused by the sonar system,
    wherein the at least two phased arrays are adapted to measure underwater characteristics of the river at different, respective, depth ranges.

17. The system of claim 16, wherein the housing assembly comprises a single housing that houses the at least two phased arrays.

18. The system of claim 16, further comprising a first phased array operating at a first frequency and a second phased array operating at a second frequency.

19. The system of claim 17, wherein the first frequency is in a range of approximately 300–600 KHz and the second frequency is in a range of approximately 1200–2400 KHz.

20. The system of claim 16, wherein the platform is a fixed structure relative to the defined channel and wherein the at least two phased arrays mounted thereon measure the flow velocity of the river with respect to the fixed structure.

21. The system of claim 16, wherein the platform is a boat moving relative to the defined channel and wherein the at least two phased arrays mounted thereon measure the flow velocity of the river with respect to the boat.

22. The system of claim 21, wherein one of the at least two phased arrays measures the motion of the boat relative to the bottom of the defined channel.

23. The system of claim 16, wherein the different frequencies are spaced apart at least by a factor of 2.

24. A method of measuring flow velocity of a river, the method comprising:

mounting a Doppler sonar system on a boat wherein the sonar system comprises a first and a second acoustic transducer operating at different frequencies;

streamlining the mounted sonar system so as to reduce its effect on the disturbance of the flow of the river;

transmitting a first and a second acoustic signal into the river wherein the first signal is transmitted by the first transducer and the second signal is transmitted by the second transducer; and receiving and processing backscattered echoes of the first and second acoustic signals wherein the echo from the first signal is used to measure the flow velocity of the river within a first range and the echo from the second signal is used to measure the flow velocity of the river within a second range, wherein the backscattered echoes result in independent data that allow independent determination of the flow velocity at each of the first and second ranges and the first and second ranges are different.

25. The method of claim 24, further comprising traversing the river on the boat to measure a sectional profile of the river's flow velocity.

26. The method of claim 25, wherein one of the acoustic signals is used to measure boat's velocity relative to the bottom of the river.

27. The method of claim 24, wherein transmitting the first and second signals comprises transmitting the first signal at a first frequency and transmitting the second signal at a second frequency.

28. The method of claim 27, wherein the first frequency is in a range of approximately 300–600 KHz and the second frequency is in a range of approximately 1200–2400 KHz.

29. The method of claim 28, further comprising offsetting the motion of the boat from the measurement using the first frequency acoustic signal to determine the boat's motion relative to the bottom of the river.

30. The method of claim 24, wherein the first and second acoustic frequency signals are spaced apart at least by a factor of 2.

31. The method of claim 24, wherein the river is a man-made channel.

32. A method of measuring flow velocity of a river, the method comprising:

mounting a Doppler sonar system on a boat wherein the sonar system comprises a phased array of transducers;

streamlining the mounted sonar system so as to reduce its effect on the disturbance of the flow of the river;

transmitting into the river at least one set of a plurality of acoustic beams formed by the phased array;

receiving a plurality of backscattered echoes from the river; and processing the echoes to determine the flow velocity of the river wherein the plurality of acoustic beams from the phased array system permit measurement of the flow velocity independent of speed of sound in the water:

wherein the plurality of backscattered echoes result in independent data that allow independent determination of the flow velocity at different, respective, depth ranges.

33. The method of claim 32, comprising traversing the river on the boat to measure a sectional profile of the river's flow velocity.

34. The method of claim 33, further comprising offsetting the motion of the boat from the measurement using a low frequency acoustic signal to determine the boat's motion relative to the bottom of the river.

35. The method of claim 32, wherein transmitting into the river comprises transmitting a first set of acoustic beams at a first frequency and a second set of acoustic beams at a second frequency.

36. The method of claim 35, wherein the first frequency is in a range of approximately 300–600 KHz and the second frequency is in a range of approximately 1200–2400 KHz.

37. The method of claim 32, further comprising determining waterflow structure and total volume of flow in a river, estuary, harbor or man-made channel.

38. A method of measuring flow velocity of a river, the method comprising:

mounting a Doppler sonar system on a boat wherein the sonar system comprises a first and a second acoustic transducer operating at different frequencies;

transmitting a first and a second acoustic signal into the river wherein the first signal is transmitted by the first transducer and the second signal is transmitted by the second transducer and each transducer is driven via separate electronics; and receiving and processing backscattered echoes of the first and second acoustic signals wherein the echo from the first signal is used to measure the flow velocity of the river within a first range and the echo from the second signal is used to measure the flow velocity of the river within a second range, wherein the backscattered echoes result in independent data that allow independent determination of the flow velocity at each of the first and second ranges.

39. The method of claim 38, further comprising traversing the river on the boat to measure a sectional profile of the river's flow velocity.

40. The method of claim 39, wherein one of the acoustic signals is used to measure boat's velocity relative to the bottom of the river.

41. The method of claim 38, wherein transmitting the first and second signals comprises transmitting the first signal at a first frequency and transmitting the second signal at a second frequency.

42. The method of claim 41, wherein the first frequency is in a range of approximately 300–600 KHz and the second frequency is in a range of approximately 1200–2400 KHz.

43. The method of claim 42, further comprising offsetting the motion of the boat from the measurement using the first frequency acoustic signal to determine the boat's motion relative to the bottom of the river.

44. The method of claim 29, wherein the first and second acoustic frequency signals are spaced apart at least by a factor of 2.

45. A method of measuring flow velocity of a river, the method comprising:

mounting a Doppler sonar system on a boat wherein the sonar system comprises a phased array of transducers;

transmitting into the river at least one set of a plurality of acoustic beams formed by the phased array;

receiving a plurality of backscattered echoes from the river; and processing the echoes to determine the flow velocity of the river wherein the plurality of acoustic beams from the phased array system permit measurement of the flow velocity independent of speed of sound in the water, wherein the plurality of backscattered echoes result in independent data that allow independent determination of the flow velocity at different, respective, depth ranges.

46. The method of claim 45, further comprising traversing the river on the boat to measure a sectional profile of the river's flow velocity.

47. The method of claim 46, further comprising offsetting the motion of the boat from the measurement using a low frequency acoustic signal to determine the boat's motion relative to the bottom of the river.

48. The method of claim 45, wherein transmitting into the river comprises transmitting a first set of acoustic beams at a first frequency and a second set of acoustic beams at a second frequency.

49. The method of claim 48, wherein the first frequency is in a range of approximately 300–600 KHz and the second frequency is in a range of approximately 1200–2400 KHz.

50. The method of claim 45, further comprising determining waterflow structure and total volume of flow in a river, estuary, harbor or man-made channel.

* * * * *